United States Patent
Mitchell (10) Patent No.: US 11,839,180 B1
(45) Date of Patent: Dec. 12, 2023

(54) POWER-ASSISTED SWEET CORN KERNEL REMOVER

(71) Applicant: Moss Lane Ranch, LLC, Templeton, CA (US)

(72) Inventor: Pat Mitchell, Templeton, CA (US)

(73) Assignee: MOSS LANE RANCH, LLC, Templeton, CA (US)

( * ) Notice: Subject to any disclaimer, the term of this patent is extended or adjusted under 35 U.S.C. 154(b) by 0 days.

(21) Appl. No.: 18/315,409

(22) Filed: May 10, 2023

Related U.S. Application Data (60) Provisional application No. 63/424,007, filed on Nov. 9, 2022.

(51) Int. Cl.
*A01F 11/06* (2006.01)

(52) U.S. Cl.
CPC .................................. *A01F 11/06* (2013.01)

(58) Field of Classification Search
CPC ............. A01F 11/06; A23N 4/00–4/24; A23N 7/00–7/10; A23N 15/00–15/12
See application file for complete search history.

(56) References Cited

U.S. PATENT DOCUMENTS

| | | | | |
|---|---|---|---|---|
| 29,673 | A * | 8/1860 | Danforth | A01F 11/06 460/55 |
| 132,958 | A * | 11/1872 | Fraizer | A01F 11/06 460/55 |
| 281,868 | A * | 7/1883 | Hamilton | A01F 11/06 460/56 |
| 1,104,677 | A * | 7/1914 | Kiovsky | A01F 11/06 460/56 |
| 1,965,469 | A * | 7/1934 | Patechen | A01F 11/06 99/537 |
| 2,326,873 | A | 8/1943 | Meek | |

(Continued)

FOREIGN PATENT DOCUMENTS

CN    108966855 A  * 12/2018
CN    109964659 A  *  7/2019

OTHER PUBLICATIONS

Moss & Embers Home Decorum. "CobTM Corn Stripper." Moss & Embers Home Decorum, mossandembers.com/products/cob%E2%84%A2-corn-stripper?_ pos=1&_sid=c3a80d1f8&_ss=r. Accessed Oct. 4, 2022.

*Primary Examiner* — Adam J Behrens
*Assistant Examiner* — Madeline I Runco
(74) *Attorney, Agent, or Firm* — SoCal IP Law Group LLP; Guy Cumberbatch (57) ABSTRACT

There is disclosed a power-assisted corn kernel remover comprising a rigid frame supporting an annular corn kernel cutter. A powered mechanism mounted above the cutter activates a piston downward to push shucked ears of fresh corn onto the cutter. The cutter is sized and has a sharp cutting edge that severs the corn kernels from the cob as the ear descends. The cob is pushed downward through a passage to a disposal bin, while the kernels are captured by a basket surrounding the cutter. The cutter is formed of spring steel and is loosely held within the frame to allow for some expansion due to different sizes of corncobs. The powered mechanism may be a pneumatic piston and cylinder assembly supplied with compressed air and having a control mechanism that permits partial activation.

16 Claims, 8 Drawing Sheets

(56) References Cited

U.S. PATENT DOCUMENTS

| | | | |
|---|---|---|---|
| 2,455,449 A * | 12/1948 | Thames | A01F 11/06 99/593 |
| 3,292,257 A | 12/1966 | Popeil | |
| 4,044,776 A | 8/1977 | Moore | |
| 4,885,842 A | 12/1989 | Marley | |
| 2012/0017779 A1 | 1/2012 | Abfall et al. | |
| 2013/0047438 A1 | 2/2013 | Yu | |
| 2020/0221894 A1 | 7/2020 | Coulter et al. | |
| 2020/0229349 A1* | 7/2020 | Grotegut | B02B 3/08 |

* cited by examiner

POWER-ASSISTED SWEET CORN KERNEL REMOVER

RELATED APPLICATION INFORMATION

This is application claims priority to U.S. provisional application No. 63/424,007 filed Nov. 9, 2022, under the same title, which is incorporated herein by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to devices for removing and collecting sweet corn kernels from the cobs.

Description of the Related Art

Many homeowners and small growers grow and can or freeze their own vegetables and fruits, as a cost saving measure or hobby, and sweet corn is quite popular. Restaurants and farm stands also serve a lot of fresh sweet corn off the cob. However, removing the kernels of fresh corn from the cob, for serving, canning or freezing, can be challenging if done in sufficient quantity. Manual tools on the market work but involve much labor and sometimes repetitive injury for even medium-sized jobs.

There exists many industrial-type machines for removing kernels of fresh corn from the cobs. These devices are adapted for removing the kernels from a plurality of cobs at any one time. See, inter alia, U.S. Pat. Nos. 3,763,867 and 5,839,954. Such devices are expensive, large and not readily adapted for home or otherwise small-scale use.

The present application discloses a fresh corn kernel cutter of increased efficiency and which is adapted for home or small grower usage.

SUMMARY OF THE INVENTION

The present application discloses a power-assisted corn kernel remover comprising a rigid frame supporting an annular corn kernel cutter. A powered mechanism mounted above the cutter activates a piston downward to push shucked ears of fresh corn onto the cutter. The cutter is sized and has a sharp cutting edge that severs the corn kernels from the cob as the ear descends. The stripped cob is pushed downward through a passage below the cutter to a disposal bin, while the kernels are captured by a basket surrounding the cutter. The cutter is formed of spring steel and is loosely held within the frame to allow for some expansion due to different sizes of corncobs. The powered mechanism may be a pneumatic piston and cylinder assembly supplied with compressed air and having a control mechanism that permits partial activation.

DETAILED DESCRIPTION

Description of Apparatus

Figure 1A:
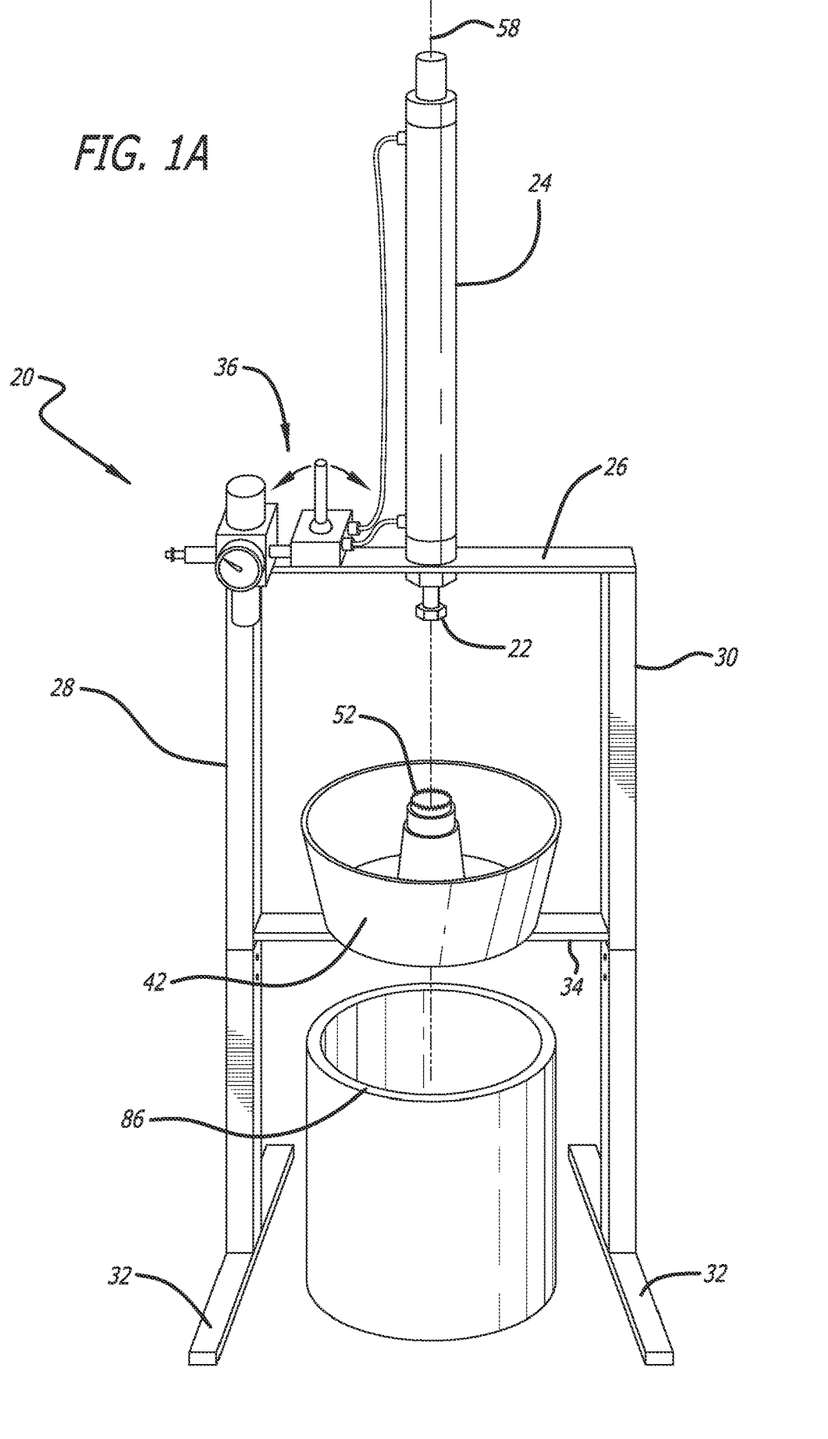
FIG. 1A is a front perspective view of the power-assisted corn kernel removal system.
Figure 1B:
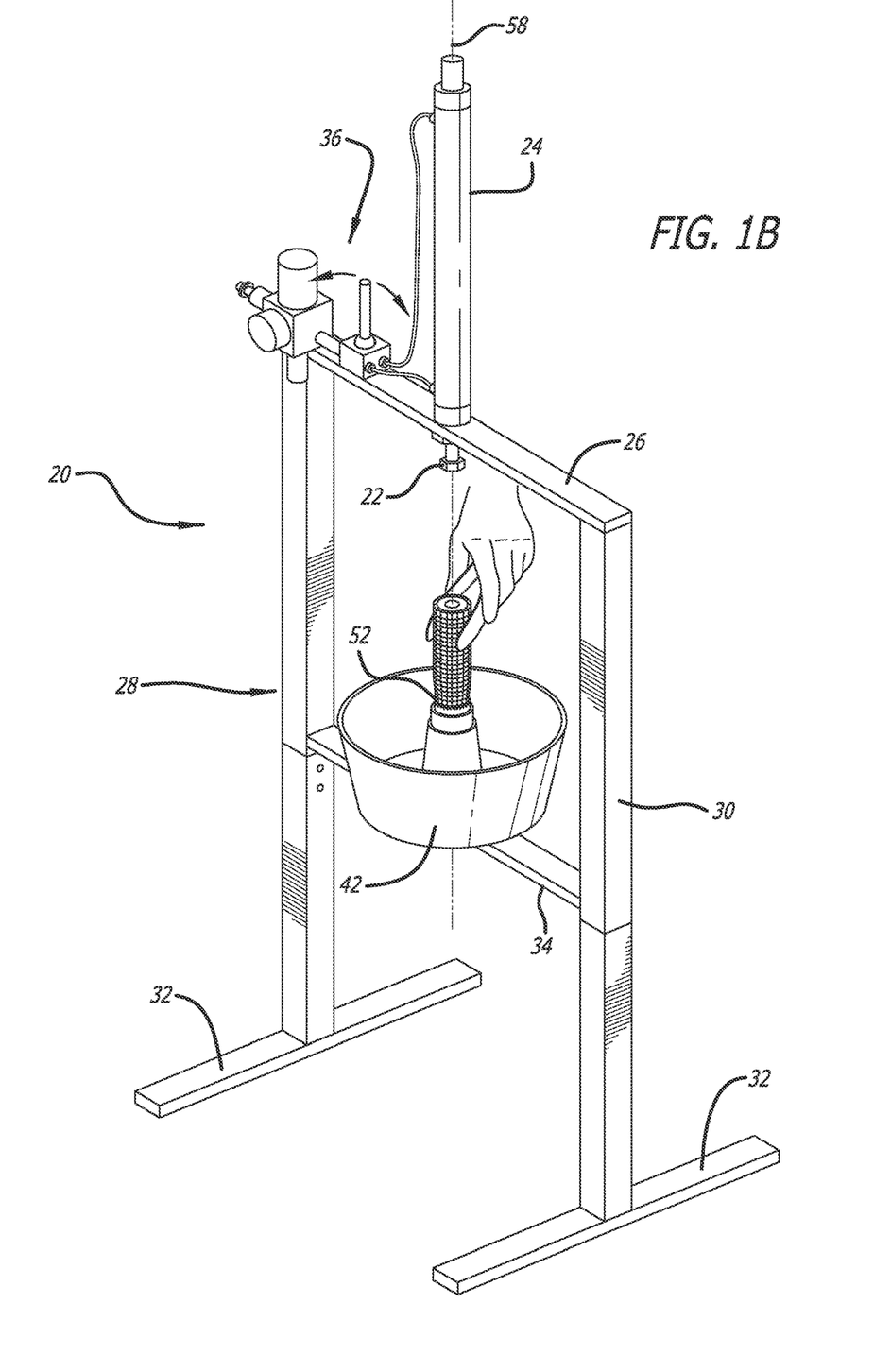
FIG. 1B is an angled perspective view thereof with a piston in a raised configuration above a corn cob positioned for imminent kernel removal.

Referring now to the drawings, FIGS. 1A and 1B show a corn kernel removal system 20 with a piston 22 in a raised configuration. The piston 22 is arranged to move linearly up and down by a powered mechanism such as an air cylinder 24 mounted on a top crossbar 26 of a system frame 28. The frame 28 includes a pair of vertical columns 30 on which the top crossbar 26 is fixed, as well as a pair of lateral feet 32 providing stability. A middle crossbar 34 extends between and is affixed to both of the vertical columns 30. The middle crossbar 34 is located roughly halfway up from the feet 32 to the top crossbar 26. A control system 36 mounted on the top crossbar 26 actuates the piston 22, and will be described below. The frame 28 is desirably assembled in a way that enables it to be shipped in a relatively small package and easily assembled, as will be explained below.

The control system 36 mounted on the top crossbar 26 desirably provides precise control of the movement of the piston 22. The piston 22 may be part of a piston and cylinder assembly, with a powered mechanism in the form of an air compressor (not shown). Alternatively, the powered mechanism may be hydraulically-powered, a linear stepper motor or an elongated screw drive.

Figure 2A:
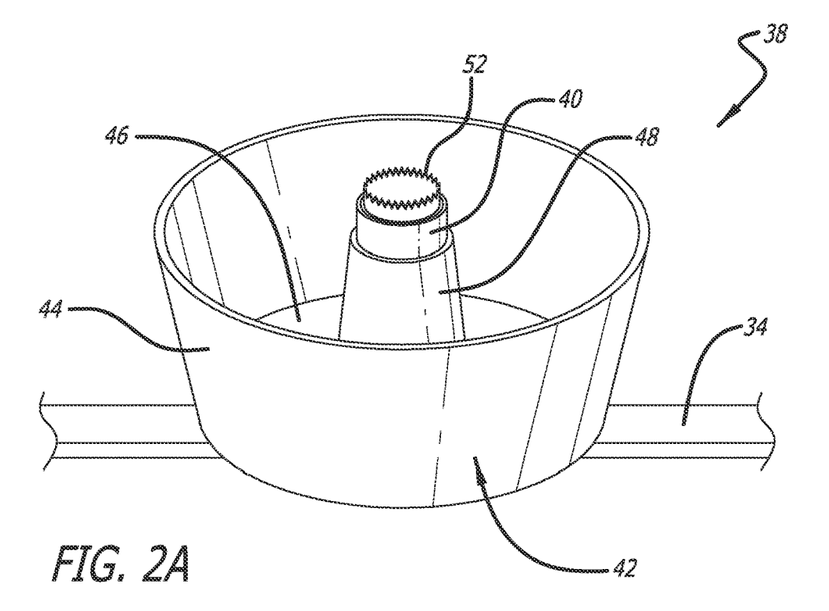
FIG. 2A is an assembly of an annular cutter mounted within the frame of the corn kernel removal system and showing a surrounding kernel collection basket.
Figure 2B:
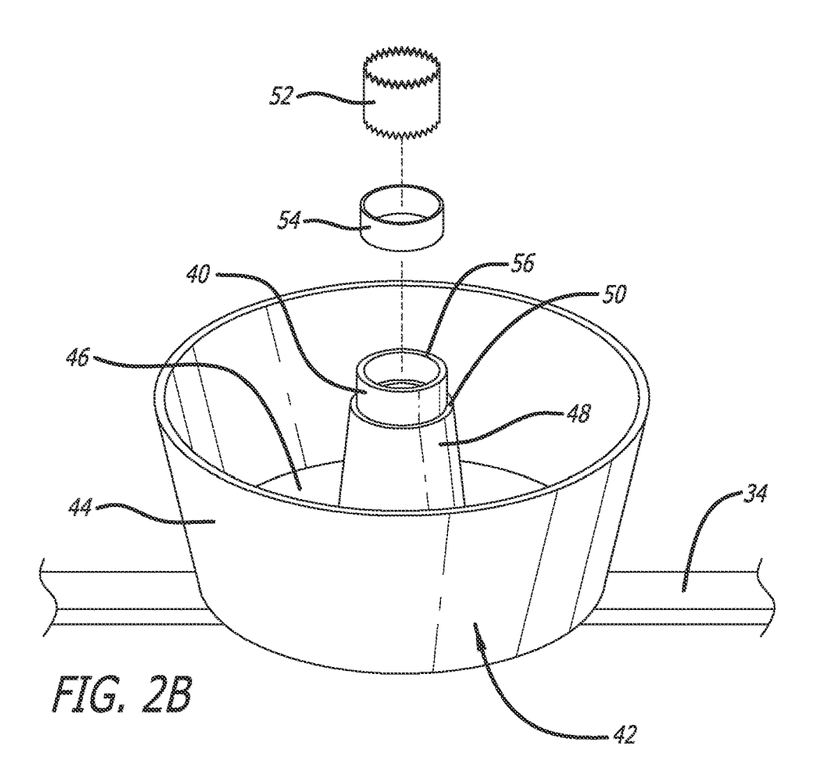
FIG. 2B is an exploded view thereof.

FIG. 2A is an assembly of a kernel removal subsystem 38 provided on the middle crossbar 34, and FIG. 2B is an exploded view thereof. A central support tube 40 attaches and extends upward from the middle crossbar 34 directly under the piston 22. A corn kernel collection basket 42 fits over the support tube 40 and desirably rests on the middle crossbar 34. The collection basket 42 resembles a Bundt pan, with a slightly angled conical outer wall 44, a floor 46, and a conical inner wall 48 concentric within the outer wall. The inner wall 48 has an open upper end 50 which fits closely around the central support tube 40.

Figure 3:
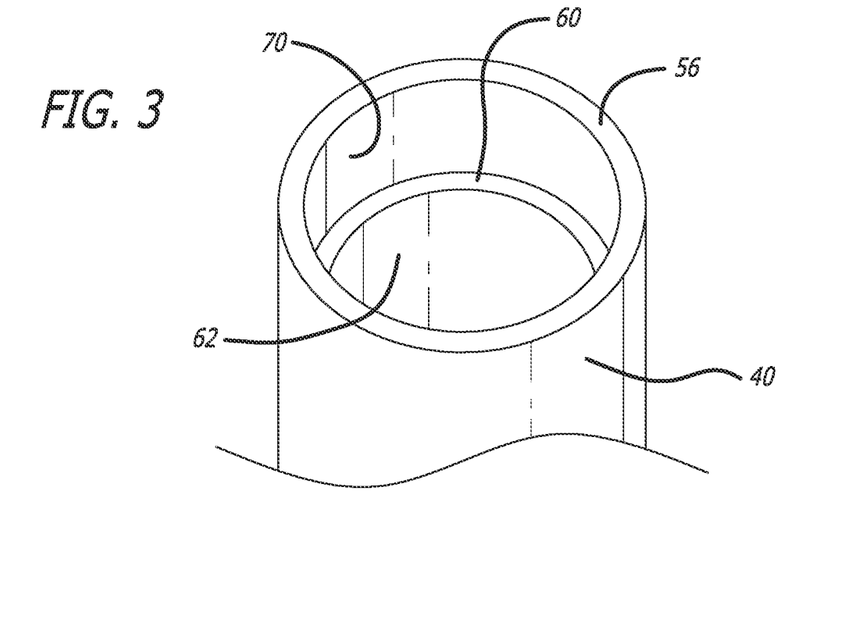
FIG. 3 is a perspective view downward into a support tube of the system frame.
Figure 4:
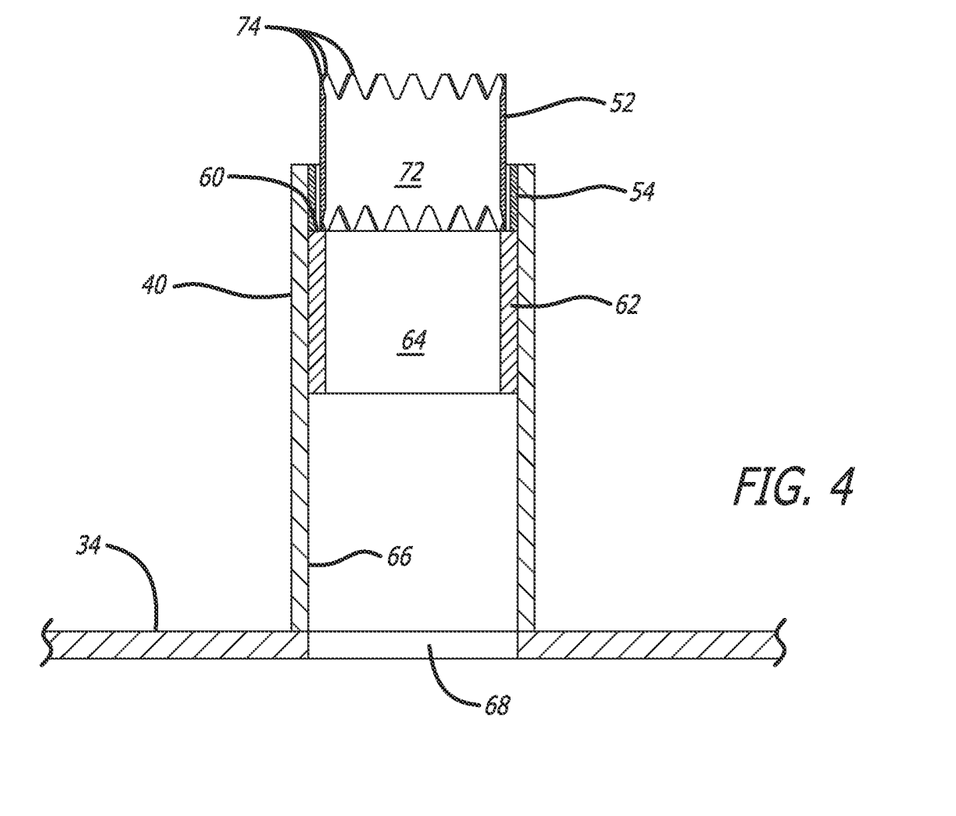
FIG. 4 is an axial sectional view through the support tube showing placement of an annular cutter and support sleeve held therein.

An annular cutter 52 that is surrounded by an annular sleeve 54 partly fits within the central support tube 40 such that a sharp circular end of the cutter projects upward from an open mouth 56 at the top of the tube as seen in FIG. 2A. FIG. 3 is a perspective view downward into the support tube 40, and FIG. 4 is a vertical sectional view through the support tube showing placement of the cutter 52 and annular sleeve 54 held therein.

As seen in FIGS. 1A and 1B, the central support tube 40 centers the kernel removal subsystem 38 directly underneath the vertically-displaced piston 22, along a central axis 58. Looking down into the support tube 40, as seen in FIG. 3, an inner ledge 60 formed by a front end of an internal support sleeve 62 is shown below the open mouth 56 of the support tube. FIG. 4 shows the support sleeve 62 having an inner lumen 64 affixed at a height roughly ¾ of the way up the inner wall 66 of the support tube 40. A lower exit hole 68 is provided in the middle crossbar 34 and has a diameter the same or larger as the diameter of the inner wall 66.

An upper segment 70 of the inner wall 66 of the support tube 40 is defined above the inner ledge 60 formed by the support sleeve 62. FIG. 4 shows how both the cutter 52 and annular sleeve 54 both rest on the inner ledge 60 formed by the support sleeve 62. The sleeve 54 has an axial dimension approximately the same as an axial dimension of the upper segment 70, while the cutter 52 is taller and projects above the sleeve and the open mouth 56 of the support tube 40. While the sleeve 54 has an outer diameter just slightly smaller than the diameter across the inner wall 66, so as to fit closely therein, the annular cutter 52 has an outer diameter which is somewhat smaller than an inner diameter of the sleeve 54, so as to fit loosely therein. The annular cutter 52 is thus loosely positioned within the support tube 40 to enable it to be removed therefrom without the need of tools or the application of force. The cutter 52 is made of spring steel and the gap provided between it and the surrounding sleeve 54 enables it to expand, as will be explained below. The annular cutter 52 has an inner lumen 72 and the sharp circular end comprises a row of sharp serrated teeth 74. The serrated teeth 74 are provided on both ends such that the cutter 52 is reversible for extended usage.

Figure 5:
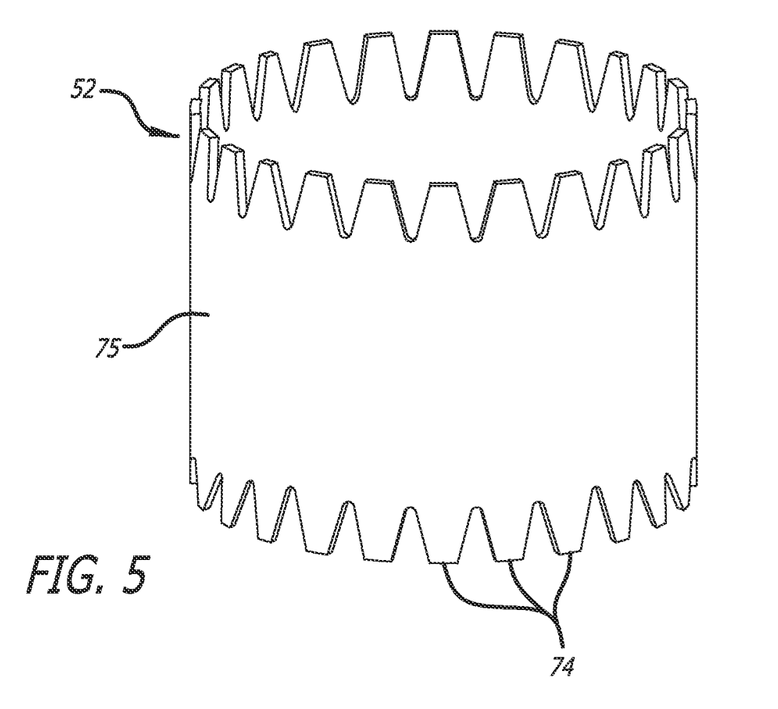
FIG. 5 is a perspective view of the annular cutter.
Figure 6A:
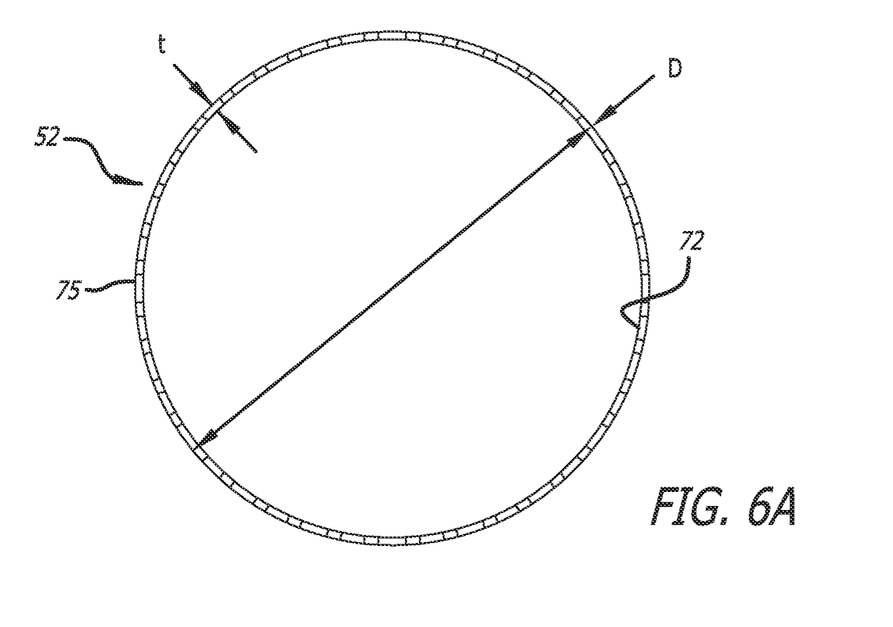
FIGS. 6A and 6B are plan and elevational views of the annular cutter.
Figure 6B:
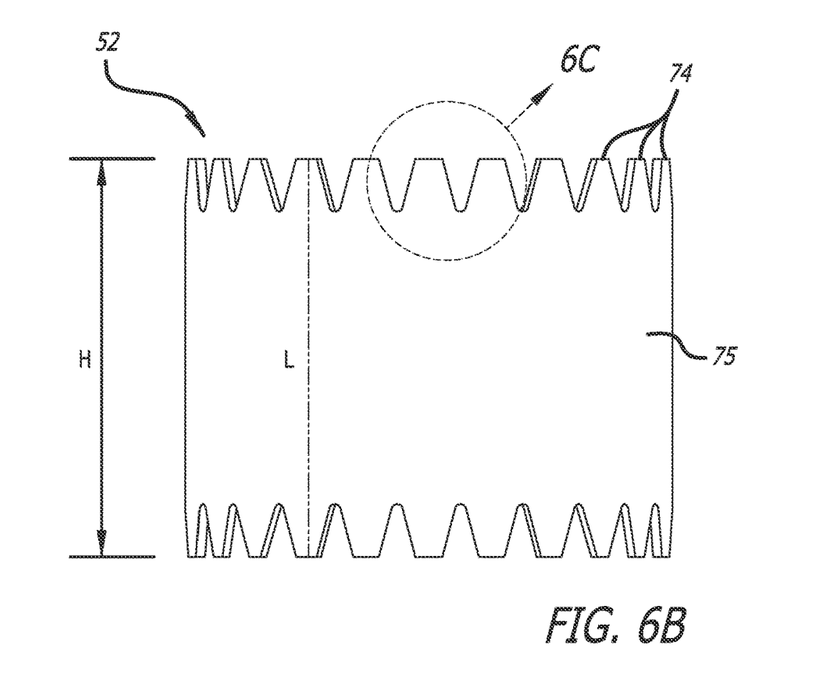

FIG. 5 is a perspective view of the annular cutter 52 which is preferably formed by a tubular spring steel body 75 having the serrated teeth 74 on both ends. FIGS. 6A and 6B are plan and elevational views of the annular cutter 52 illustrate several major dimensions. Namely, the body 75 has an outer diameter D and a wall thickness t. In one example, the outer diameter D is between 1.2-1.6 inches and the wall thickness t is between 0.01-0.20 inches. The overall height H of the cutter 52 may vary, but is preferably between 0.5-3.0 inches.

Figure 6C:
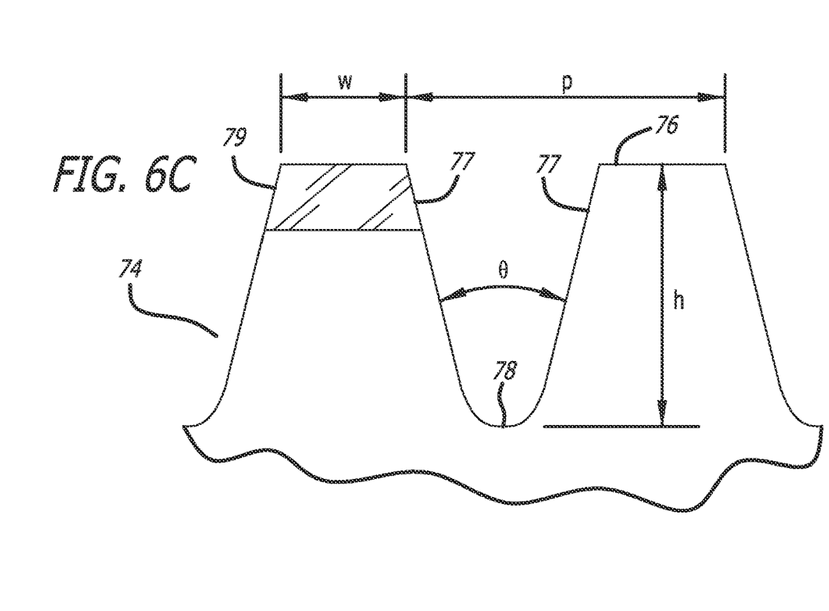
FIG. 6C is an enlarged view of two of the teeth of the cutter.

FIG. 6C is an enlarged view of two of the teeth 74 of the cutter 52, showing several exemplary dimensions. Namely, each tooth 74 has an axial height h, and a circumferential width w at the top land 76. Adjacent teeth are spaced apart by a circumferential pitch p, and each tooth has opposite side edges 77 each forming an included angle θ with an adjacent side edge and having a rounded root surface 78. Preferably, the above tooth dimensions are: axial height h is between 1.0-5.0 mm; circumferential width w of top land 76 is between 0.5-6.0 mm; circumferential pitch p is between 0.6-6.0 mm; side edges form an included angle θ of between 10-85 degrees.

As illustrated, each tooth 74 has a generally trapezoidal configuration with a flat top land 76 and gradually widening side edges 77 to the adjacent rounded root surfaces 78. The top land 76 may be flat as shown or somewhat rounded. Forming the teeth 74 to be flat or rounded in this manner helps increase the service life, as the repetitive cutting of the corn kernels off the cob does not easily dull the teeth. An upper end of each one of the teeth may be sharpened, such as the radially tapered tip 79 indicated in FIG. 6C. Providing teeth 74 on both axial ends of the annular cutter 52 essentially doubles the life of the cutter.

A balance is reached between the sharpness of the teeth 74 in both circumferential and radial aspects, and the wall thickness t of the tubular body 75. Teeth that are too sharp will wear to fast, while the wall thickness cannot be too great otherwise the annular cutter 52 will not flex easily from different sized kernels. As will be explained below, the annular cutter 52 is constructed to flex outward somewhat to accommodate variable-sized corn cobs during repeated use. The use of a relatively thin-walled cutter 52 made of a spring-steel annular tube with some space surrounding the cutter enables this flexing. Although an annular cutter 52 formed of a contiguous annular tube is preferred for the sake of longevity, the flexing might also be accomplished by using a spiral cutter, such as by providing a break line L as seen in dashed line in FIG. 6B indicating overlapping free ends. With such a spiral configuration, the material of the cutter 52 need not be spring steel, and may be another metal such as stainless steel or the like. Indeed, even durable plastic may be used, though the teeth 74 may not last as long. It is thus noted that the term "an annular cutter capable of radial flexing" encompasses these and other like constructions.

Figure 7A:
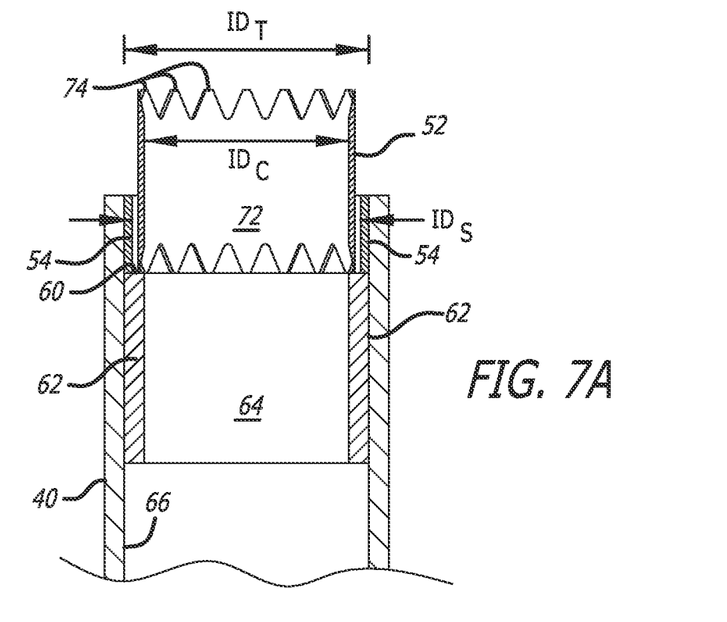
FIG. 7A is an axial sectional view of an upper end of the support tube showing certain dimensions of the annular cutter and support sleeve assembly therein.

FIG. 7A is an axial sectional view of an upper end of the support tube 40 showing certain dimensions of the annular cutter 52 and support sleeve 54 assembly therein. The outside diameter ODc of the cutter 52 may be 1.2-1.6 inches, while the inside diameter IDc of the cutter 52 may be 1.1-1.5 inches. The inside diameter IDT of the support tube 40 may be 1.25-1.75 inches, while the inside diameter IDs of the sleeve 54 may be 1.25-1.65 inches. The relative dimensions leave a suitable annular space around the cutter 52 to enable some flexing from larger than average corn cobs. For instance, an annular gap around the cutter 52 of about 0.3-1.2 mm is considered adequate, with 0.3-0.6 mm being preferred.

Figure 7B:
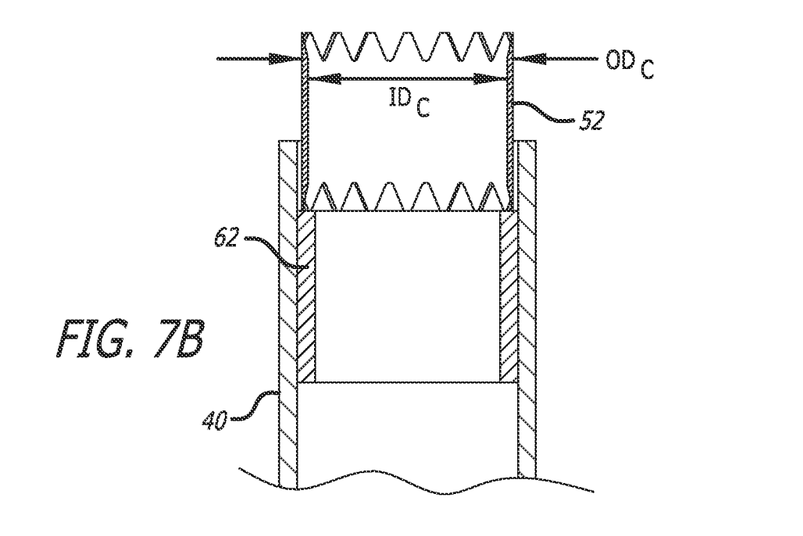
FIG. 7B is an axial sectional view of an alternative assembly with just an annular cutter within the support tube.

FIG. 7B is an axial sectional view of an alternative assembly with just an annular cutter 52 within the support tube 40. The stainless steel annular sleeve 54 may be used for smaller diameter cutters 52 to provide an outer support hoop to permit limited outward flexing of the cutter 52. However, if the corn cobs are larger than usual, the annular sleeve 54 may be removed so as to enable insertion of a larger annular cutter 52. This provides some flexibility to the system 28 to adapt to different corn sizes. The outside diameter ODc of the cutter 52 may be 1.5-1.75 inches, while the inside diameter IDc of the cutter 52 may be 1.45-1.70 inches.

Figure 8:
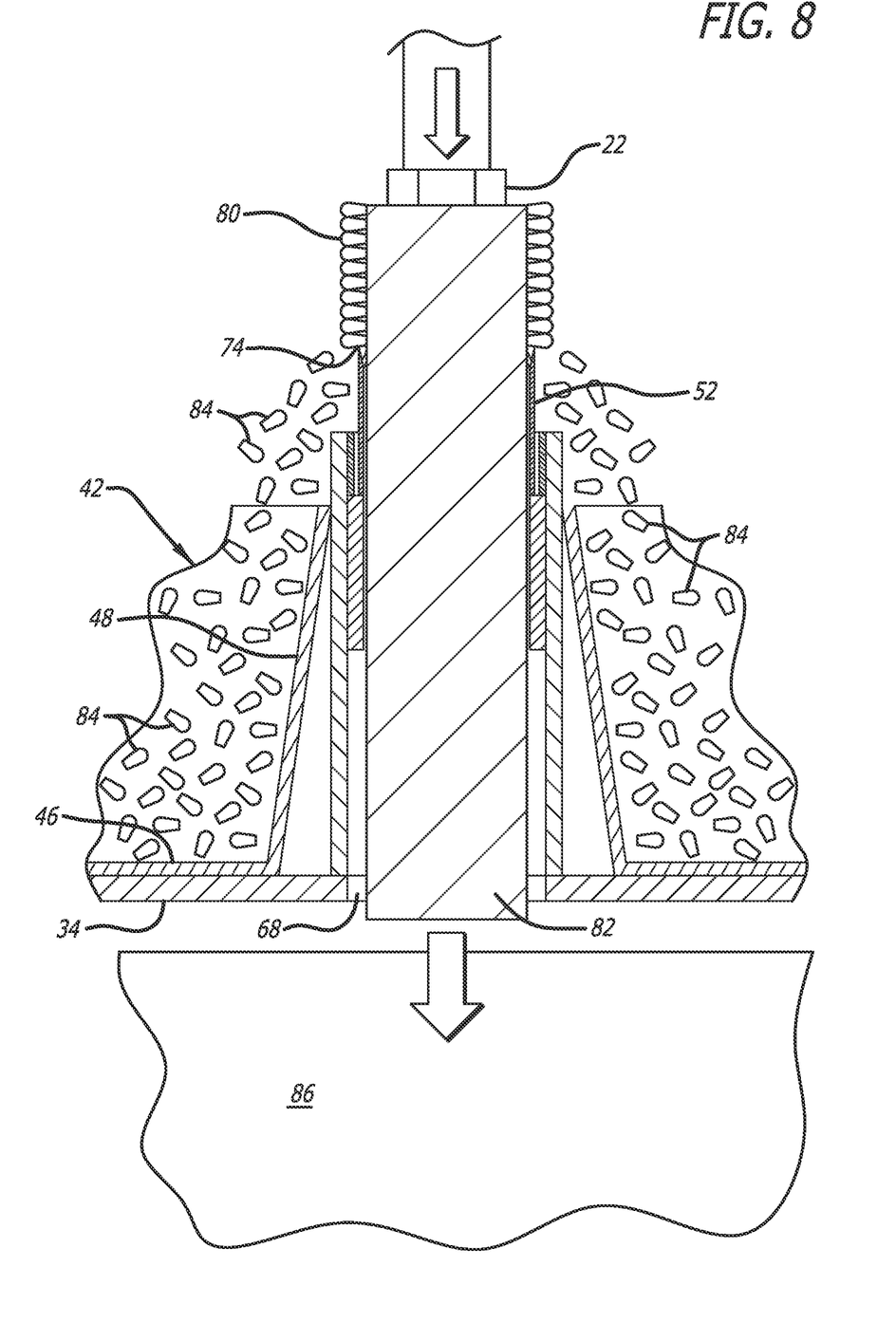
FIG. 8 is an axial sectional view of the assembly of FIG. 2A showing operation of the corn kernel removal system.

With reference now to FIG. 8, a sectional view of the corn kernel removal system 20 in use is shown. A shucked ear of fresh corn 80 is shown being pushed downward by the piston 22, as indicated by the arrows. Most of the cob 82 has passed through the cutter 52 such that the sharp teeth 74 sever and separate the fresh kernels 84 from the cob 82. The kernels 84 fall into the surrounding kernel collection basket 42. The piston 22 ha a length and axial travel that extends its leading end at least past the top of the annular cutter 52, and preferably farther to push the stripped cob down through the support sleeve 62 so as to drop through the assembly. The piston 22 preferably has a shaft of at least ¼ inch diameter, and a leading end of at least ¾ inch wide to provide good contact with the top of the cob. The stripped cob 82 passes through the kernel removal subsystem 38 and falls into a lower bin 86, also seen in FIG. 1A, which can be a 5-gallon plastic or other bin used for disposing of or recycling the cobs.

The cobs 82 typically vary very little in diameter for a given yield, most often between 1-⅛ and 1¼ inch. Beneficially, the loose fit of the annular cutter 52 within the sleeve 54 allows some outward flex of the spring steel cutter for thicker cobs. Also, a larger diameter cutter 52 may be provided and used without the surrounding sleeve 54 for larger cob averages, such as in the alternative assembly of FIG. 7B. In that case, the diameter of the cutter 52 is made slightly smaller than the diameter of the upper segment 70 of the inner wall 66 so that the cutter can again cut a range of cob diameters. The cutter 52 is sized to remove most of each of the kernels 84 from the cob 82, but of course some variance in that yield is expected.

Shipping and assembly of the corn kernel removal system 20 are facilitated by an efficient frame construction. The system frame 28 are desirably separable into three main sections—a top subframe and two lower legs, as indicated by the joints seen in FIGS. 1A and 1B just below the middle crossbar 34. More particularly, the rigid frame 28 includes the pair of vertical columns 30 on which the top crossbar 26 is fixed, preferably welded. The middle crossbar 34 extends between and is affixed to upper sections of both of the vertical columns 30, again preferably by welding. The generally square assembly of the top and middle crossbars 26, 34 and upper sections of the vertical columns 30 define the upper subframe oriented in a vertical plane. The support tube 40 is welded in a vertical orientation on the middle crossbar 34, and the powered mechanism (e.g., air cylinder 24) with piston 22 is mounted to the top crossbar 34 with the piston extending downward above the support tube 40.

The lower sections of both of the vertical columns 30 are each secured to one of the feet 32, with the feet oriented perpendicular to the vertical plane of the upper subframe. The upper and lower sections of the vertical columns 30 may be disconnected to enable parallel stacking of the subframe and the two lower sections and feet for reduced shipping volume. The frame sections as well as the piston/cylinder assembly and other parts can then be separated and packed into a relatively small shipping container. The upper frame part and the piston/cylinder are preferably pre-assembled and shipped together for alignment and torquing purposes, while the legs are packed separately.

The control system 36 in a pneumatic piston/cylinder assembly preferably includes a 5-way 3-position hand control valve. This enables the user to displace the piston 22 up and down in the cylinder at several speeds and stop the piston in any position. As explained in the instructions for use below, the user can slowly lower the piston 22 until it contacts the top of the ear of corn, and then move the piston down faster to trim the kernels.

To assemble and use, first remove all the components of the corn kernel removal system 20 from the shipping container. Slide the lower sections of the vertical columns 30 into the bottom of the upper sections. Install the fastening screws and tighten. Set the system 20 upright and attach a quick connect air fitting from a pneumatic supply to the control system 36. Place the collection basket 42 over the support tube 40. Insert the annular cutter 52, and annular sleeve 54 if needed, into the top of the support tube 40. Set the air pressure to 75-85 psi. Cycle the piston 22 up and down with the control handle of the control system 36 to verify the lower end of the piston 22 passes through the cutter 52.

For best results use sweet corn that has been freshly picked, and discard bent or deformed ears. Also avoid using extra-large diameter cobs which might jam within the support tube 40. Make sure the corn is husked and the silk removed. Place a 5-gallon plastic bucket under the support tube 40 to catch the stripped cobs. Preferably position a chair on one side of the frame for comfort. Make sure the blunt end of the cobs are cut squarely. Using tongs or other grasping instrument, hold each ear of corn centered over the annular cutter 52 with the pointed end down. Engage the control handle with your other hand until the piston 22 contacts the ear of corn. Then engage the control handle of the control system 36 all the way until it pushes the cob through the annular cutter 52. If an ear jams within the support tube 40, cut it off just above the cutter 52, and then the ear should be easily pushed through with the piston 22. Reverse the control handle until the piston fully retracts, and proceed to the next ear of corn.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A power-assisted corn kernel remover system comprising:
 a) a rigid frame supporting an annular cutter capable of radial flexing positioned in the frame to accommodate varying cob diameters, the frame defining a support tube oriented along an axis having an inner diameter larger than the annular cutter, the support tube including an inner ledge inset from an open mouth, the inner ledge having an inner diameter smaller than an inner diameter of the annular cutter and being inset from the open mouth such that a sharp circular end of the annular cutter projects beyond the open mouth, the annular cutter being loosely positioned within the support tube to enable the annular cutter to be removed therefrom without the need of tools or the application of force, wherein the annular cutter is formed by an annular tube of spring steel with sharp circular opposing axial ends each comprising a plurality of circumferentially spaced teeth; and b) a piston supported and actuated by a powered mechanism mounted on the rigid frame to move the piston along the axis, the piston having a forward end extending toward the annular cutter, wherein positioning a corn cob on the annular cutter and aligned with the axis and actuating the piston pushes the corn cob toward the annular cutter to cause removal of the external corn kernels while pushing the now stripped cob at least partly through the support tube.

2. The system of claim 1, wherein the circumferentially spaced teeth are trapezoidal in shape with flat or rounded top lands.

3. The system of claim 1, further including an annular sleeve sized to loosely surround the annular cutter within the support tube and being supported on the inner ledge.

4. The system of claim 1, wherein the rigid frame comprises includes a pair of vertical columns on which a top crossbar is fixed, with a middle crossbar extending between and is affixed to both of the vertical columns, and the support tube is secured in a vertical orientation on the middle crossbar, the powered mechanism being mounted to the top crossbar with the piston extending downward above the support tube.

5. The system of claim 4, further including a corn kernel collection basket that fits over the support tube and rests on the middle crossbar.

6. The system of claim 1, wherein the powered mechanism is a pneumatic piston/cylinder assembly configured to axially displace the piston, the system also including a control system for actuating the pneumatic piston/cylinder assembly and mounted on the rigid frame.

7. The system of claim 6, wherein the control system includes a hand control valve configured to displace the piston up and down in the cylinder at several speeds and stop the piston in any position.

8. A power-assisted corn kernel remover comprising:
a) a rigid frame supporting an annular cutter formed by an annular tube of spring steel positioned in the frame to accommodate varying cob diameters, the frame defining a support tube oriented along an axis having an inner diameter larger than the annular cutter, the support tube supporting the annular cutter aligned with the axis such that a sharp circular end of the annular cutter projects beyond an open mouth of the support tube, the annular cutter being loosely positioned within the support tube to enable the annular cutter to be removed therefrom without the need of tools or the application of force, and wherein the annular cutter has sharp circular opposing axial ends; and b) a piston supported and actuated by a powered mechanism mounted on the rigid frame to move the piston along the axis, the piston having a forward end extending toward the annular cutter, wherein positioning a corn cob on the annular cutter and aligned with the axis and actuating the piston pushes the corn cob toward the annular cutter to cause removal of the external corn kernels while pushing the now stripped cob at least partly through the support tube.

9. The system of claim 8, wherein the sharp circular end comprises a plurality of circumferentially spaced teeth.

10. The system of claim 9, wherein the circumferentially spaced teeth are trapezoidal in shape with flat or rounded top lands.

11. The system of claim 8, further including an annular sleeve sized to loosely surround the annular cutter within the support tube.

12. The system of claim 8, wherein the rigid frame comprises includes a pair of vertical columns on which a top crossbar is fixed, with a middle crossbar extending between and is affixed to both of the vertical columns, and the support tube is secured in a vertical orientation on the middle crossbar, the powered mechanism being mounted to the top crossbar with the piston extending downward above the support tube.

13. The system of claim 12, further including a corn kernel collection basket that fits over the support tube and rests on the middle crossbar.

14. The system of claim 12, wherein the rigid frame further includes pair of horizontally oriented feet secured to lower ends of the vertical columns, and the vertical columns are each formed by an upper section and a lower section, wherein the upper sections connect between the top crossbar and middle crossbar to define an upper subframe in a vertical plane, and wherein each lower section is secured to one of the feet with the feet oriented perpendicular to the vertical plane, and the upper and lower sections may be disconnected to enable parallel stacking of the subframe and the two lower sections and feet for reduced shipping volume.

15. The system of claim 8, wherein the powered mechanism is a pneumatic piston/cylinder assembly configured to axially displace the piston, the system also including a control system for actuating the pneumatic piston/cylinder assembly and mounted on the rigid frame.

16. The system of claim 15, wherein the control system includes a hand control valve configured to displace the piston up and down in the cylinder at several speeds and stop the piston in any position.

* * * * *